ISO-8601

United States Patent [19]

Ichiyanagi

[11] 4,161,003

[45] Jul. 10, 1979

[54] DEVICE FOR HOLDING A ROTATABLE RECORD DISC

[75] Inventor: Yutaka Ichiyanagi, Yokohama, Japan

[73] Assignee: Sony Corporation, Tokyo, Japan

[21] Appl. No.: 897,425

[22] Filed: Apr. 18, 1978

[30] Foreign Application Priority Data

Apr. 20, 1977 [JP] Japan .................. 52-49707[U]

[51] Int. Cl.² .................. G11B 19/00; G11B 5/82
[52] U.S. Cl. .................. 360/99; 279/1 B; 360/137
[58] Field of Search .......... 360/97, 99, 135, 137; 274/10 S, 39 A; 206/303; 51/358, 367, 237 R; 279/1 B; 358/128

[56] References Cited

U.S. PATENT DOCUMENTS

| 2,908,541 | 10/1959 | Fomenko | 360/97 |
|---|---|---|---|
| 3,609,722 | 9/1971 | Zenzefilis | 360/97 |
| 3,734,516 | 5/1973 | Smith | 279/1 B |
| 3,838,460 | 9/1974 | Stewart | 360/99 |
| 3,898,814 | 8/1974 | Chou | 360/99 |
| 4,022,478 | 5/1977 | Stewart | 274/10 S |
| 4,068,851 | 1/1978 | Yamamura | 358/128 |

OTHER PUBLICATIONS

IBM Technical Disc. Bulletin, vol. 19, No. 6, 11/76, "Collet Mechanism for Centering & Clamping a Magnetic Disk," Lightner, 1976, p. 2202.

Primary Examiner—Jay P. Lucas
Attorney, Agent, or Firm—Lewis H. Eslinger; Alvin Sinderbrand

[57] ABSTRACT

A device for holding a rotatable record disc includes a support base rotatable about a central axis and having a supporting surface normal to the axis for supporting one side of a record disc and a projecting boss engaging the central hole of the disc for aligning the disc with respect to the axis, and a clamp assembly having a clamp housing, adapted to be disposed at the other side of the record disc, and provided with locking elements for locking the clamp housing with respect to the base against movement away from the latter. The locking elements are radially, slidably mounted in the clamp housing and have locking claws extending from their inner ends for engaging respective locking recesses in the rotatable base. The locking elements have portions exposed at diametrically opposed sides of the clamp housing for allowing manual urging thereof to provide simultaneous release of the locking claws and removal of the clamp assembly from the support base. The clamp assembly further has a clamp base extending from the clamp housing for being movable against the other side of the record disc and being movable relative to the clamp housing in the direction of the axis, and springs urging the clamp base relative to the clamp housing in the direction of the axis toward the other side of the record disc for clamping the latter between the clamp base and the supporting surface.

11 Claims, 3 Drawing Figures

DEVICE FOR HOLDING A ROTATABLE RECORD DISC

BACKGROUND OF THE INVENTION

1. Field of the Invention

This invention generally relates to video disc players and more particularly is directed to a device for securely holding a video or other record disc during the rotation thereof.

2. Description of the Prior Art

Generally, in a video disc player, the information is recorded in substantially concentric circular tracks on a rotatable disc. The tracks may comprise successive turns of a continuous spiral or be separate, radially spaced circular tracks. When a high concentration of tracks is necessary to record an economically feasible amount of information on a single disc, it is desirable that the reproducing apparatus for reading information from the successive tracks be very accurately controlled and also that the alignment of the center of the video record disc in respect to the axis of rotation be held very accurately. When a frame of video information is recorded in each track, the video disc has to rotate at a speed of 1800 r.p.m. in the case of an NTSC signal or at a speed of 1500 r.p.m. in the case of a PAL signal. In order to insure that the disc alignment remains within operative limits at such speeds, the disc must be securely held or fastened to the rotary support therefor.

In an existing device for holding and rotating a video disc during reproduction of the informaton recorded thereon, the disc is held between a rotatable base and a clamping device. The clamping device is secured to the rotatable base by the mutual engagement of complementary threaded portions thereon. Force from the threaded engagement of such portions is transmitted directly through an annular rubber pad on the clamping device and a supporting surface on the rotatable base for clamping the record disc securely therebetween. A portion of the rotatble base engages in a circular opening at the center of the disc for providing accurate concentric alignment of the disc with the axis of rotation. Altnough the described device holds the record disc securely for accurate alignment during high speed rotation, changing or replacing the video disc requires that several turns of the clamping device be effected with respect to the rotatable base which operation is troublesome and undesirble for consumer applications.

Another mechanism for securing a record disc in accurate concentric alignment with a rotated support is disclosed in U.S. Pat. No. 3,609,722. Such mechanism includes a rotatable base with an upwardly facing supporting surface and an outwardly facing surface on an upstanding rim for engaging the central opening of the record disc to provide axial alignment therefor. The base further has a central boss projecting axially through the central opening of the record disc and having an inner circumferential recess. The mechanism further includes a clamping device having a cup-shaped body and an annular, radially directed flange slideably mounted thereon. A helical spring wound around the cup-shaped body biases the annular flange with respect thereto, so that when the cup-shped body is attached to the boss, the annular flange engages the upwardly facing surface of the record disc and the biasing force of the helical spring thereby exerts downward pressure on the top of the record disc. The cup-shaped body is releasably attachable to the boss by detent balls which project from a sleeve within the cup-shaped body and are engageable in the circumferential recess in central boss of the base. The detent balls are released in reponse to a downward pressure applied to push-button axially slidable in the sleeve. The application of such downward pressure on the push-button at the same time that the cup-shaped body is raised makes it difficult to remove the clamping device from the base.

OBJECTS AND SUMMARY OF THE INVENTION

Accordingly, it is an object of the present invention to provide an improved device for holding a rotatable record disc during the reproducing of signals recorded thereon, and which holds the disc securely in accurate concentric alignment with the axis of rotation.

More particularly, it is an object of the present invention to provide a disc-holding device that can be easily engaged and disengaged for convenient changing of the record disc.

It is another object of the invention to provide a disc-holding device which includes a rotatable base and a clamping device for holding the record disc therebetween and wherein the clamping device may be easily removed from the rotatable base by a simple manipulation thereof which simultaneously releases and removes the clamping device from the rotatable base.

It is a further object of the invention to provide a disc-holding device, as aforesaid, in which the centrifugal force due to rotation of the holding device ensures that the rotatable base and clamping device remain securely attached to each other during high-speed rotation of the apparatus.

In accordance with an aspect of this invention, a device for holding a rotatable record disc having a central opening includes a base rotatable about a central axis and having means defining a supporting surface normal to the axis and against which one side of the record disc may engage, means engageable in the central opening of the disc, when the latter engages the supporting surface, for concentrically aligning the disc with respect to the axis, and first locking means; and a clamp means having a clamp housing adapted to be disposed at the other side of the record disc when the one side of the latter engages the supporting surface, a plurality of locking elements slidably mounted in the clamp housing for movement relative to the latter in directions radially with respect to the axis, locking claws extending from the inner ends of the locking elements and being engageable with the first locking means upon outwardly radial movement of the locking elments, means biasing the locking elements in an outwardly radial direction for maintaining engagement of the claws in the first locking means to secure the clamp housing against movement away from the base with the clamp housing disposed at said other side of the record disc, the locking elements having portions exposed at diametrically opposed sides of the clamp housing for allowing simultaneous manipulation thereof toward each other for release of the locking claws and removal of the clamp means from the base, a clamp base extending from the clamp housing for engaging against the other side of the record disc and being movable relative to the clamp housing in the direction of the axis, and resilient means urging the clamp base relative to the clamp housing in the direction of the axis toward the other side of the record disc for clamping the latter between the clamp base and the supporting surface.

In one embodiment of the present invention the rotatable base includes a cylindrical boss extending from the supporting surface and being concentrically aligned with the axis of rotation for engaging in the central opening of the record disc, and the first locking means is defined by a radially inwardly opening recess in the inner surface of the boss.

Further, in the disc-holding device according to the invention, the locking elements are arranged so that centrifugal force due to rotation of the holding device urges the locking elements to their engaged positions for ensuring the secure holding of the record disc.

The above, and other objects, features and advantages of the invention, will be apparent in the following detailed description of an illustrative embodiment which is to be read in conjunction with the accompanying drawings.

DETAILED DESCRIPTION OF A PREFERRED EMBODIMENT

Figure 1:
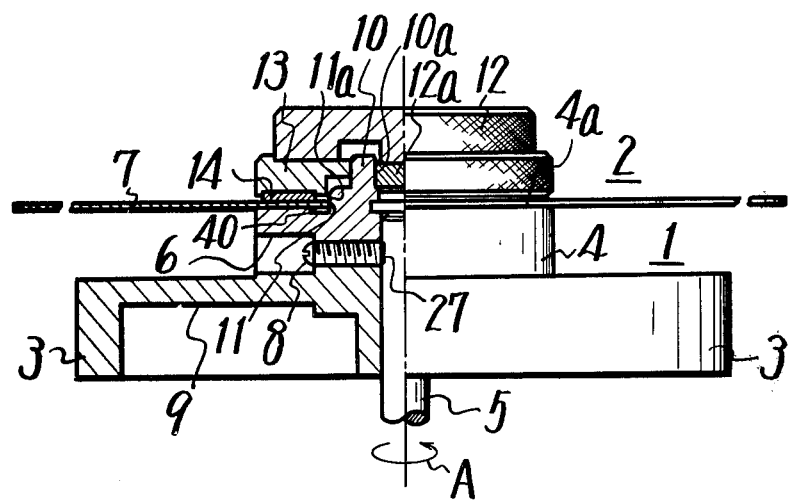
FIG. 1 is a side elevational view of a conventional disc-holding device which is shown partly in section.

In order to provide an enhanced understanding of the problems solved by this invention, reference will first be made to FIG. 1 in which a conventional disc-holding device is shown to include a rotatable base 1 and a clamping device 2, with a record disc 7 held therebetween. More specifically, the rotatable base 1 includes a flywheel 3 with a raised circular step 4 forming a supporting surface 4a for the record disc 7. The flywheel 3 may be hollowed-out, as at 9, and a radial, tapped bore 6 may be formed in step 4 to receive a set screw 8 which secures base 1 on a shaft 5 by engaging a concave recess 27 in the latter. The base 1 is rotated by the shaft 5 around the longitudinal axis of the latter, as indicated by the arrow A.

The base 1 further includes a boss 10 which protrudes from the supporting surface 4a for insertion through a central opening in the record disc 7. The boss 10 has an outwardly facing circumferential surface 11a for engaging the inwardly directed edge of central opening 11 of the disc, thereby holding the record disc 7 in concentric alignment with the axis of rotation.

The clamping device 2 is shown to include an upper clamping screw 12 and a clamping base 13. A rubber pad 14 is mounted on the lower surface of the clamping base 13 for contacting and transmitting force to the other side of the record disc 7. The clamping screw 12 has a threaded portion 12a for engagement with a complementary internally threaded portion 10a of the boss 10. Rotational movement of the clamping screw 12 with respect to the base 1 allows engagement and disengagement of these members and clamps the record disc 7 between pad 14 on clamping base 13 and surface 4a on base 1. The direction of the threads 10a and 12a is selected so that the rotation of the clamping device with shaft 5 tends to tighten the threaded connection therebetween.

The conventional device shown in FIG. 1 is adequate for securely holding a record disc even at the high rotational speeds encountered in a video record disc player. Unfortunately, in order to change a record disc held by the device of FIG. 1, it is necessary to block the rotation of base 1 and to rotate clamping device 2 about two or three turns to disengage threads 12a from threads 10a, and then to repeat the operation after changing the disc.

Figure 2:
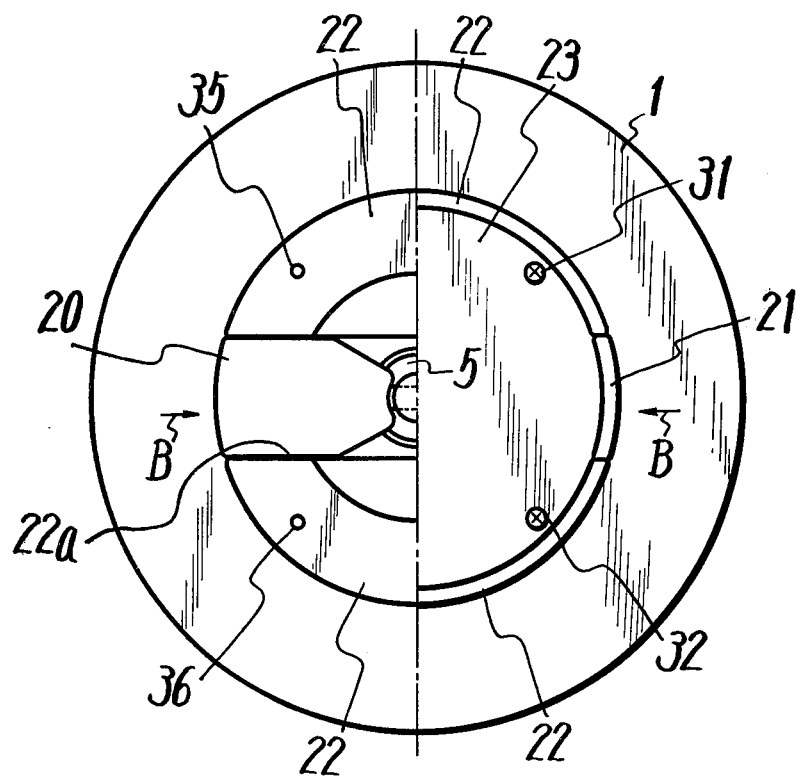
FIG. 2 is a plan view, partially broken away, of a disc-holding device according to one embodiment of the present invention.
Figure 3:
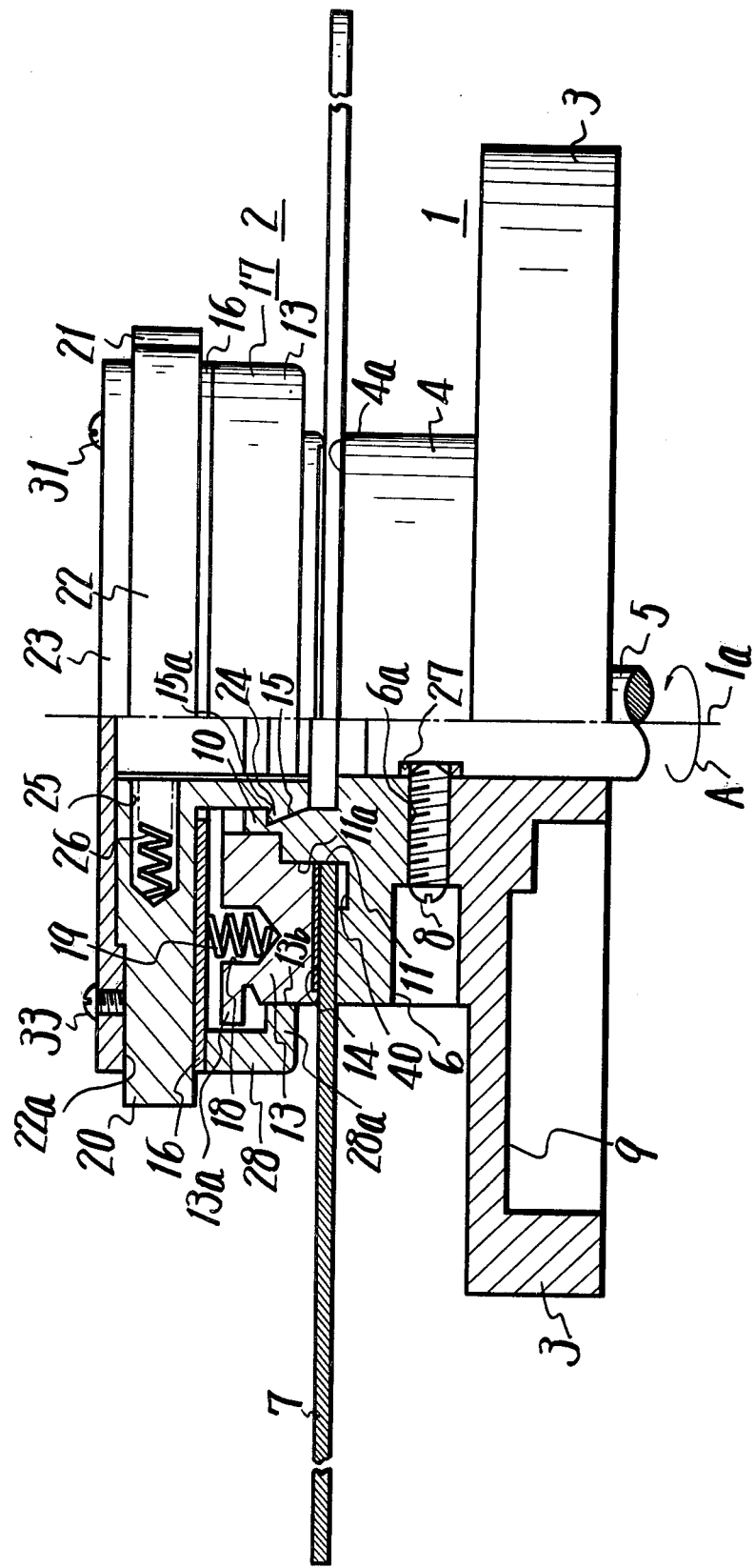
FIG. 3 is an enlarged side elevational view of the disc-holding device of FIG. 2, and which is shown partly in section.

FIGS. 2 and 3 illustrate a record disc holding device according to an embodiment of the present invention, and in which parts corresponding to those described above with reference to FIG. 1 are identified by the same reference numerals. The record disc-holding device of FIGS. 2 and 3 is shown to include a base 1 rotatable about an axis 1a, and a clamping device 2 for holding a record disc 7 therebetween. More specifically, the base 1 includes a flywheel 3 with a central, raised circular step 4 forming a supporting surface 4a normal to the axis 1a and engageble with one side of the record disc 7. The base 1 is mounted on a shaft 5 for rotation with the latter, for example, in the direction of the arrow A, around the axis 1a. The base 1 has a radial bore 6 having a tapped inner portion 6a for receiving a set screw 8 therein. The set screw 8 is tightened into a concave recess 27 of the shaft 5 for securing the base 1 thereon.

A boss 10 extends upwardly from the supporting surface 4a of step 4. The boss 10 is intended to engage with a central opening in the record disc 7, when the latter engages the supporting surface 4a, and thereby provides means for aligning the disc 7 with axis 1a. In the embodiment of FIG. 3, such aligning means is formed by a circumferential outwardly facing surface 11a concentric with the axis 1a on the boss 10. Boss 10 also includes means for accurately aligning the clamping device 2 with respect to the axis 1a. For this purpose, the circumferential outwardly facing surface 11a is made large enough to extend upwardly through the record disc 7 to provide additional surface area for concentric axial alignment of the device 2.

In the illustrated embodiment of the invention, boss 10 is cylindrical in shape and a first locking means is provided at the inner surface of the cylindrical boss means 10 in the form of a recess 15. The recess 15 includes a radial surface 15a which faces downwardly, or in the axial direction opposed to the direction in which supporting surface 4a faces, and which is engageable by other locking means, as hereinafter described in detail, for preventing movement of the clamping device 2 away from the base 1 when the device 2 and base 1 are disposed at opposite sides of the disc 7.

The clamping device 2 is shown to include a clamping base 13 having an annular rubber pad 14 mounted thereon for engaging the other side of record disc 7. The clamping base 13 is constructed with an inwardly facing surface that is complementary to the surface 11a of boss 10 to accurately align clamping base 13 relative to axis 1a and thereby prevent vibration during high speed rotation of the holding device.

The clamping device 2 further includes a clamp housing 17 which is adapted to be disposed at the side of record disc 7 opposite to the side of the latter engaging supporting surface 4a. The clamp housing 17 includes an annular plate 16, two segmental spacers 22, a lid 23 and a lower housing member 28. Screws, as indicated at 31, 32 and 33, extend through holes in lid 23, in spacers 22 as indicated at 35 and 36 on FIG. 2, and in plate 16 and are tapped into threaded holes (not shown) in lower housing member 28. Thus, diametrical channels 22a are defined between spacers 22 intermediate plate 16 and lid 23. The clamping device 2 further includes locking elements 20 and 21 that are releasably engageable with the locking means or recess 15 of the base 1.

The locking elements 20 and 21 are radially slidably mounted in the aforementioned diametrical channels 22a defined in clamp housing 17 between housing plate 16, lid 23 and spacers 22. Each of the locking elements 20 and 21 includes a locking claw 24 extending downwardly and then radially outward from the inner end thereof. Thus, when clamp housing 17 is in its operative position shown on FIG. 3, locking claws 24 can extend downwardly into boss 10 and then radially outward into recess 15. Each locking claw 24 has a cross-section corresponding to that of recess 15. Thus, where recess 15 has a triangular cross-section tapering downwardly, as shown on FIG. 3, each claw 24 has a similar triangular cross-section to present an upwardly facing surface engageable against downwardly facing surface 15a in recess 15 to prevent upward removal of clamp housing 17 from its operative position.

The locking elements 20 and 21 are biased radially outward to maintain engagement of claws 24 in recess 15. In the case where there are two locking elements 20 and 21 in diametrically opposed relation, as shown, the radially outward biasing of the locking elements may be effected by a single helical compression spring 26 which seats, at its opposite ends, in sockets 25 formed in locking elements 20 and 21 and opening radially inward toward each other. It is further to be noted that the radially movable locking elements 20 and 21 are shaped and disposed to dispose the entire mass of each locking element at a respective side of the axis 1a. Thus, elements 20 and 21 have centers of gravity spaced or displaced radially outward from the axis of rotaton 1a, so that, upon rotation of the record disc holding device, the centrifugal forces acting on locking elements 20 and 21 urge the latter radially outward, that is, in the directions for maintaining claws 24 in engagement with recess 15. Furthermore, the locking elements 20 and 21 are uniformly angularly spaced apart about axis 1a, for example, diametrically opposed as in the illustrated embodiment, for facilitating the dynamic balancing of the record disc-holding device.

The radially outer ends of locking elements 20 and 21 project from the respective channels 22a so as to be exposed at diametrically opposite sides of clamp housing 17. Thus, the radially outer ends of locking elements 20 and 21 can be grasped in the direction of the arrows B on FIG. 2 by opposed fingers of one hand for effecting the simultaneous manual urging of locking elements 20 and 21 toward each other or radially inward and thereby releasing locking claws 24 from recess 15.

As shown particularly on FIG. 3, lower housing member 28 of clamp housing 17 has an inwardly directed lower flange 28a which extends under an outwardly directed flange or rim 13a at the upper portion of clamping base 13 so as to prevent the downward removal or separation of clamping base 13 from clamp housing 17. Further, the annular, inwardly directed edge surface of flange 28a slidably engages a circumferential surface 13b on clamping base 13 which projects downwardly from housing member 28 and is movable in the direction of the axis 1a relative to clamp housing 17. Clamping base 13 is yieldably urged axially in the direction out of lower housing member 28, that is, downwardly as viewed on FIG. 3. For example, such yieldable urging of clamping base 13 may be effected by a plurality of helical compression springs 19 which are received in equally spaced apart sockets 18 in the upper surface of clamping base 13 and which bear against the underside of plate 16.

In order to ensure that any burr formed on the edge of the central opening 11 of a record disc 7 will not interfere with the smooth seating of the record disc on supporting surface 4a, the latter may be formed with an annular undercut channel 40 adjacent to the surface 11a engaged by the edge of opening 11.

The above-described record disc-holding device according to an embodiment of this invention operates as follows:

With clamping device 2 initially separated from base 1, a video or other record disc 7 can be easily disposed on such base so as to engage the supporting surface 4a of the latter with the boss 10 extending upwardly through the central opening 11 of the record disc and with the circumferential surface 11a on the boss 10 closely engaging the edge of the central opening 11 of the record disc for concentrically aligning the latter with the axis of rotation 1a. With the record disc 7 thus located on base 1, clamping device 2 is positioned above the record disc substantially in alignment with axis 1a so that claws 24 will be positioned over the central opening of boss 10. Clamping device 2 is then merely pressed downwardly, for example, by a downward force applied to lid 23 of clamp housing 17. Due to the downwardly tapering triangular configuration of claws 24, the downward pressure applied to housing 17 and the consequent downward movement of the latter relative to base 1 is accompanied by the engagement of the tapering surfaces of claws 24 with the inner edge surface of boss 10 at the top of the latter so that locking elements 20 and 21 are displaced radially inward against the force of spring 26 for entry of claws 24 into the central opening of boss 10. As clamp housing 17 is moved downwardly, the movement of clamping base 13 therewith is limited by the engagement of pad 14 thereon with the side of record disc 7 opposite to the side engaging supporting surface 4a. Thereafter, further downward movement of clamp housing 17 occurs independently of corresponding movement of clamping base 13 so that flange 28a moves away from flange or rim 13a and springs 19 are compressed to provide the force for clamping the record disc 7 between pad 14 and supporting surface 4a. Finally, in the course of the downward movement of clamp housing 17 relative to base 1, claws 24 come into registry with recess 15 and are then moved radially outwardly into recess 15 under the influence of spring 26 acting on the respective locking elements 20 and 21. When claws 24 enter recess 15, the engagement of the upwardly facing shoulder of each claw 24 with the downwardly facing surface 15a at the top of recess 15 secures clamp housing 17 against upward separation from base 1. With clamping device 2 thus operatively positioned (FIG. 3), record disc 7 is securely held or clamped against supporting surface 4a on base 1 by the force of compressed springs 19 exerted on disc 7 through clamping base 13 and pad 14. Upon rotation of the record disc-holding device and disc 7 with shaft 5, locking elements 20 and 21 are centrifically urged in the radially outward direction, thereby increasing the surety of engagement of the respective claws 24 in recess 15. Thus, there is no danger that clamping device 2 will be accidentally separated from base 1 during high-speed rotation of the record disc-holding device.

When it is desired to exchange the record disc 7, the user grasps the clamping device 2 and employs opposed fingers for exerting radially inwardly directed forces, as indicated by the arrows B on FIG. 2, against the exposed outer ends of locking elements 20 and 22 for moving the latter inwardly against the force of spring 26 and thereby disengaging claws 24 from recess 15. Upon such disengagement of claws 24 from recess 15, and while clamping device 2 is still grasped, as aforesaid, device 2 is raised relative to base 1, thereby upwardly withdrawing claws 24 from within boss 10 and separating clamping base 13 from around the boss. Thereupon, record disc 7 can be removed from base 1 and replaced with another similar record disc, and clamping device 2 can be returned to its operative position, as previously described, for clamping the new record disc on base 1.

It will be apparent from the above that the engagement and disengagement of clamping device 2 with base 1 can be very easily accomplished, and that, when clamping device 2 is in its operative condition in engagement with base 1, a record disc is securely held therebetween and inadvertent release of the clamping device 2 from base 1 is prevented even during high-speed rotation of the record disc-holding device.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A device for holding a rotatable record disc having a central opening therethrough, comprising:
    a support base rotatable about a central axis and including means defining a supporting surface normal to said axis and against which one side of the record disc may engage, means engageable in said central opening of the disc, when the latter engages said supporting surface, for concentrically aligning the disc with said axis, and first locking means; and
    clamp means including a clamp housing adapted to be disposed at the other side of the record disc when one side of the latter engages said supporting surface, a plurality of locking elements which are slidably mounted in said clamp housing so as to be movable relative to the latter in directions radially with respect to said axis, locking claws extending from inner ends of said locking elements and being engageable with said first locking means upon outwardly radial movement of said locking elements, biasing means for urging said locking elements in outwardly radial directions with respect to said axis for maintaining engagement of said claws with said first locking means and thereby securing said clamp housing against movement away from said base with said clamp housing disposed at said other side of the record disc, said locking elements having outer portions exposed at diametrically opposite sides of said clamp housing for allowing simultaneous manual urging thereof toward each other to provide release of said locking claws from said first locking means and thereby permit removal of said clamp means from said base, a clamp base extending from said clamp housing for engaging against said other side of the record disc and being movable relative to said clamp housing in the direction of said axis, and resilient means urging said clamp base relative to said clamp housing in the direction of said axis toward said other side of the record disc for clamping the latter between said clamp base and said supporting surface.

2. A device according to claim 1; wherein said means engageable in the central opening of the disc includes a circular boss means extending from said supporting surface and being concentrically aligned with said axis.

3. A device according to claim 2; wherein said boss means is cylindrical in shape, and said first locking means are located in the inner surface of said cylindrical boss means.

4. A device according to claim 3; wherein said first locking means are constituted by recesses in said inner surface of the boss means, and said recesses define shoulders in a plane perpendicular to said axis and engageable by said locking claws.

5. A device according to claim 1; wherein said biasing means includes a spring interposed between said locking elements.

6. A device according to claim 5; wherein said biasing means further includes means operable by centrifugal force on rotation of said device.

7. A device according to claim 6; wherein said means operable by the centrifugal force of rotation of said device includes dislocation of the center of gravity of said locking elements off of said axis.

8. A device according to claim 1; wherein said locking elements are equally spaced around said axis for dynamic balance during rotation of said device.

9. A device according to claim 1; wherein said resilient means includes a plurality of compressed springs located between said clamp base and said clamp housing.

10. A device according to claim 9; further including means forming an extensible limit between said clamp base and said clamp housing to prevent the separation of said clamp base from said clamp housing during removal of said clamp means from said base.

11. A device according to claim 1; wherein said rotatable base includes means engageable with said clamping base for aligning the latter concentrically with said axis.

* * * * *